(12) United States Patent
Nagano et al.

(10) Patent No.: US 12,296,660 B2
(45) Date of Patent: May 13, 2025

(54) VEHICLE BACK DOOR (71) Applicant: Nissan Motor Co., Ltd., Kanagawa (JP)

(72) Inventors: Seiichirou Nagano, Kanagawa (JP); Hiroyuki Fujiki, Kanagawa (JP); Ryuji Norota, Kanagawa (JP); Takuya Tani, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 305 days.

(21) Appl. No.: 17/926,458

(22) PCT Filed: May 20, 2020

(86) PCT No.: PCT/JP2020/019941
§ 371 (c)(1),
(2) Date: Nov. 18, 2022

(87) PCT Pub. No.: WO2021/134856
PCT Pub. Date: Nov. 25, 2021

(65) Prior Publication Data
US 2023/0182551 A1 Jun. 15, 2023

(51) Int. Cl.
B60J 5/10 (2006.01)
B60J 9/00 (2006.01)

(52) U.S. Cl.
CPC .................. B60J 5/107 (2013.01); B60J 5/10 (2013.01); B60J 9/00 (2013.01)

(58) Field of Classification Search
CPC ............... B60J 5/10; B60J 5/101; B60J 5/107
USPC .......................................... 296/146.6, 146.8
See application file for complete search history.

(56) References Cited

U.S. PATENT DOCUMENTS

| 11,634,013 B2 * | 4/2023 | Kuntze | B29C 45/14065 |
| | | | 296/146.6 |
| 2020/0114739 A1 | 4/2020 | Kuntze et al. | |
| 2020/0164929 A1 * | 5/2020 | Kuntze | B60J 5/101 |

FOREIGN PATENT DOCUMENTS

| CA | 3067859 A1 | 1/2019 |
| JP | 2010-159037 A | 7/2010 |
| JP | 6166670 B2 | 7/2017 |
| JP | 6166673 B2 | 7/2017 |
| JP | 6488186 B2 | 3/2019 |
| JP | 2019-132336 A | 8/2019 |
| WO | 2019/006271 A1 | 1/2019 |
| WO | 2019/151053 A1 | 8/2019 |

* cited by examiner

Primary Examiner — Jason S Daniels
(74) Attorney, Agent, or Firm — Osha Bergman Watanabe & Burton LLP (57) ABSTRACT A vehicle back door has a first cord-like member disposed in a door body formed of a resin panel member. The first cord-like member has a wire that is routed in the panel member, a first mounting member that fixes the wire to the panel member, a second mounting member that fixes the wire to the panel member, and a bracket that movably holds an intermediate part between the first mounting member and the second mounting member of the wire.

4 Claims, 7 Drawing Sheets

FIG. 9

VEHICLE BACK DOOR

TECHNICAL FIELD

The present invention relates to a vehicle back door.

BACKGROUND ART

Patent Literatures 1 to 3 disclose a vehicle back door capable of preventing a large hole from being formed in a resin panel member constituting a door body even if the resin panel member is shattered. In this vehicle back door, a stretchable reinforcing sheet is provided in a door body.

CITATION LIST

Patent Literature

Patent Literature 1: U.S. Pat. No. 6,166,670
Patent Literature 2: U.S. Pat. No. 6,166,673
Patent Literature 3: U.S. Pat. No. 6,488,186

SUMMARY OF THE INVENTION

Technical Problem

However, in the methods disclosed in Patent Literatures 1 to 3, the reinforcing sheet is firmly fixed to a fixing part of the door body. Therefore, there is a risk that stress may be concentrated on the fixing part, thereby inducing breakage of the door body.

The present invention is devised in view of the above problems, and an object of the present invention is to provide a vehicle back door capable of relieving a concentration of stress and suppressing breakage of a door body.

Solution to Problem

A vehicle back door according to one aspect of the present invention includes a cord-like member provided in a door body formed of a resin panel member, in which the cord-like member includes: a cord-like body part that is routed from a first fixing point to a second fixing point of the door body, a first mounting member that fixes the cord-like body part to the first fixing point, a second mounting member that fixes the cord-like body part to the second fixing point, and a holding member that movably holds an intermediate part, between the first mounting member and the second mounting member, of the cord-like body part.

Advantageous Effects

According to the present invention, it is possible to relieve a concentration of stress and suppress breakage of a door body.

DESCRIPTION OF EMBODIMENT

An embodiment of the present invention will be described below with reference to the drawings. In the drawings, the same parts are denoted by the same reference numerals and the description thereof is omitted.

A vehicle back door according to the present embodiment will be described. This vehicle back door is applied to a hatchback type automobile, and opens and closes an opening at the rear of a vehicle body. The upper end of the vehicle back door is connected to the rear end of the roof of the vehicle body via a hinge mechanism (not shown), and the vehicle back door is rotated in the vertical direction around the hinge mechanism.

Figure 1:
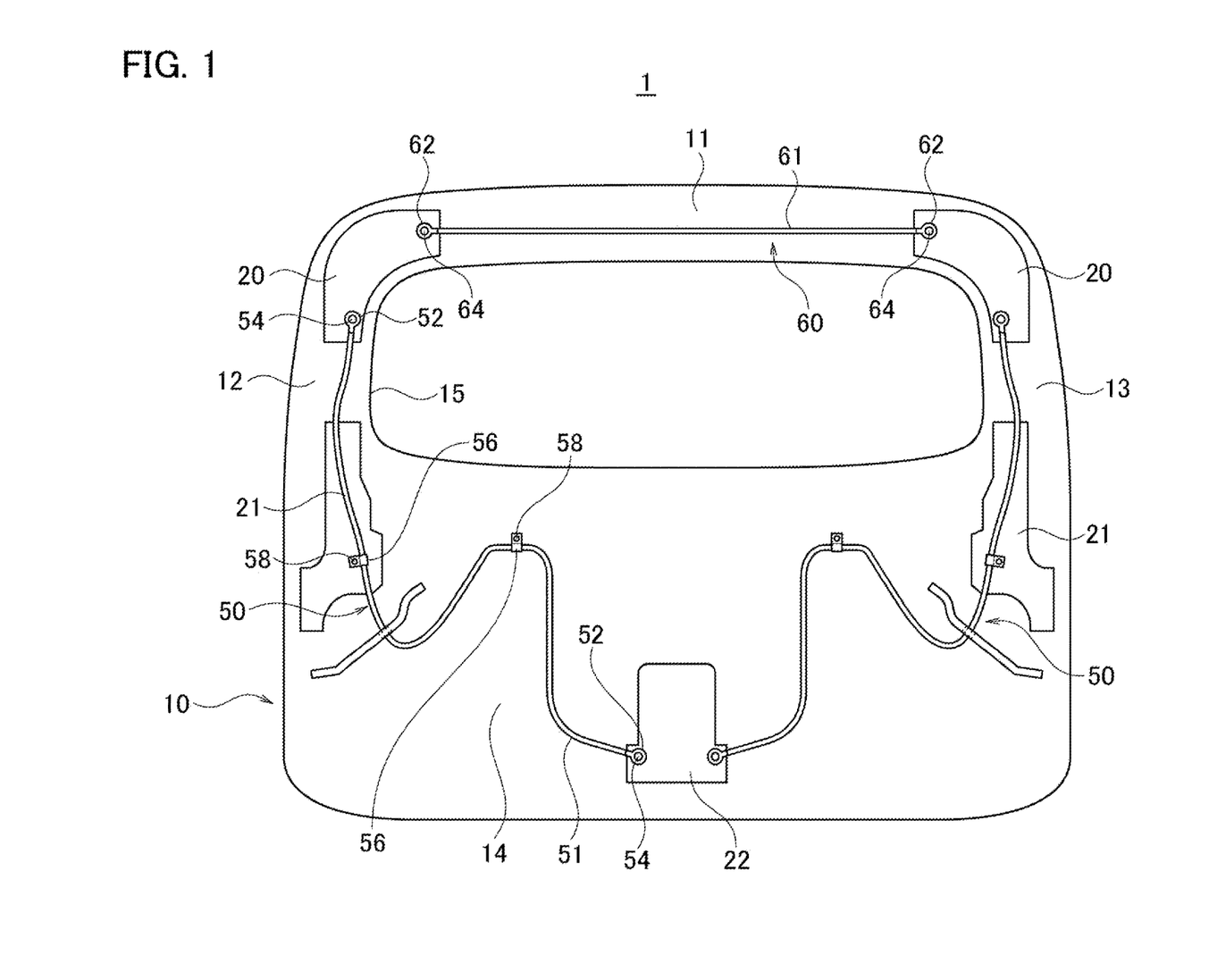
FIG. 1 is an explanatory diagram showing a configuration of a vehicle back door according to the present embodiment.

In FIG. 1, a vehicle back door is mainly configured of a door body 1 formed of a resin panel member and first and second cord-like members 50 and 60 provided in the door body 1.

Figure 6:
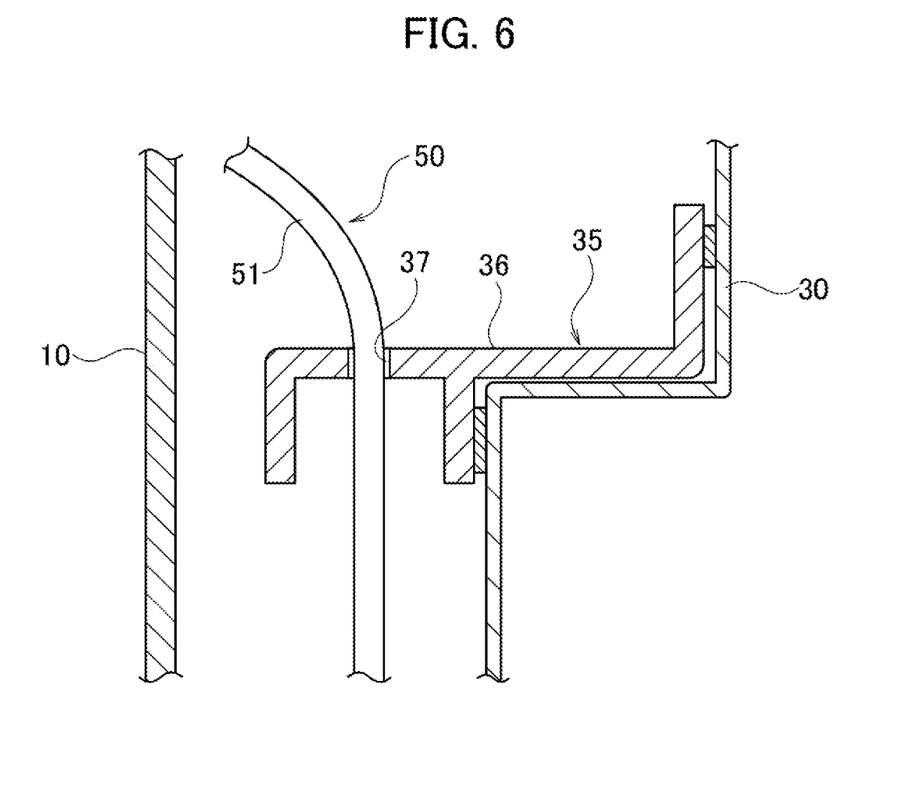
FIG. 6 is an explanatory diagram showing a modified example of a bracket.

The door body 1 includes a door inner panel 10 forming a door half body on the vehicle interior side and a door outer panel 30 forming a door half body on the vehicle exterior side (see FIG. 6). The door inner panel 10 and the door outer panel 30 are molded articles made of a resin material such as a glass fiber reinforced resin, and each of them is formed as one panel, for example. The peripheral part of the door inner panel 10 and the peripheral part of the door outer panel 30 are bonded together by using an adhesive, for example. The door body 1 is formed into a closed cross section in which a space is formed. FIG. 1 shows the door body 1 as viewed from the rear of the vehicle. FIG. 1 shows only the door inner panel 10 and does not show the door outer panel 30.

Required shapes such as protrusions/recesses and openings necessary for the design and function of the vehicle back door are formed in the door inner panel 10, but the door inner panel 10 is formed in a flat shape as a whole. In FIG. 1, detailed shapes such as protrusions/recesses and openings formed in the door inner panel 10 are omitted (the same applies to FIGS. 7 and 8, which will be described later.).

An opening 15 corresponding to the rear window is formed in the approximate center of the door inner panel 10. The door inner panel 10 includes an upper part 11 positioned above the opening 15, side parts 12 and 13 respectively positioned on the left and right sides of the opening 15, and a lower part 14 positioned below the opening 15.

A plurality of stiffening members 20, 21, and 22 for compensating the rigidity of the door inner panel 10 are formed on the door inner panel 10. Each of the stiffening members 20, 21, and 22 is formed of a material having high rigidity such as metal.

The first stiffening members 20 are provided so as to span between the upper part 11 and the left side part 12 and so as to span between the upper part 11 and the right side part 13. The first stiffening members 20 reinforce mounting parts to which hinge mechanisms used for connecting the door body 1 to the roof rear end are mounted. The second stiffening members 21 are provided so as to span between the left side part 12 and the lower part 14 and so as to span between the right side part 13 and the lower part 14. The third stiffening member 22 is provided at the lower center portion of the lower part 14. The third stiffening member 22 reinforces a mounting part to which a latch unit of a lock mechanism for locking the door body 1 to a vehicle body is mounted.

The first and second cord-like members 50 and 60 are disposed between the individual stiffening members 20, 21, and 22, and are routed so as to surround the circumference of the opening 15 of the door inner panel 10 once. The first and second cord-like members 50 and 60 perform a role of suppressing the shattering of each piece of the divided door body 1 when a large load has acted on the door body 1 such as in a rear collision.

The first cord-like members 50 are provided on the right and left sides of the center of the door body 1. The right first cord-like members 50 and the left first cord-like members 50 are configured symmetrically with the center of the door body 1 as a boundary. Each of the first cord-like members 50 is routed from one of the first stiffening members 20, which is a first fixing point to the third stiffening member 22 which is a second fixing point, via one of the second stiffening members 21 and a predetermined portion of the lower part 14 which are relay points.

The first cord-like members 50 are routed to extend along a predetermined route instead of the shortest route in which the distance between routing points including the first and second fixing points and the two relay points is the shortest distance. From the viewpoint that the total length of the first cord-like members 50 is sufficiently longer than the total length of the shortest route and that interference between door components forming the vehicle back door and the first cord-like members 50 is avoided, the route along which the first cord-like members 50 are routed is preset.

Figure 2:
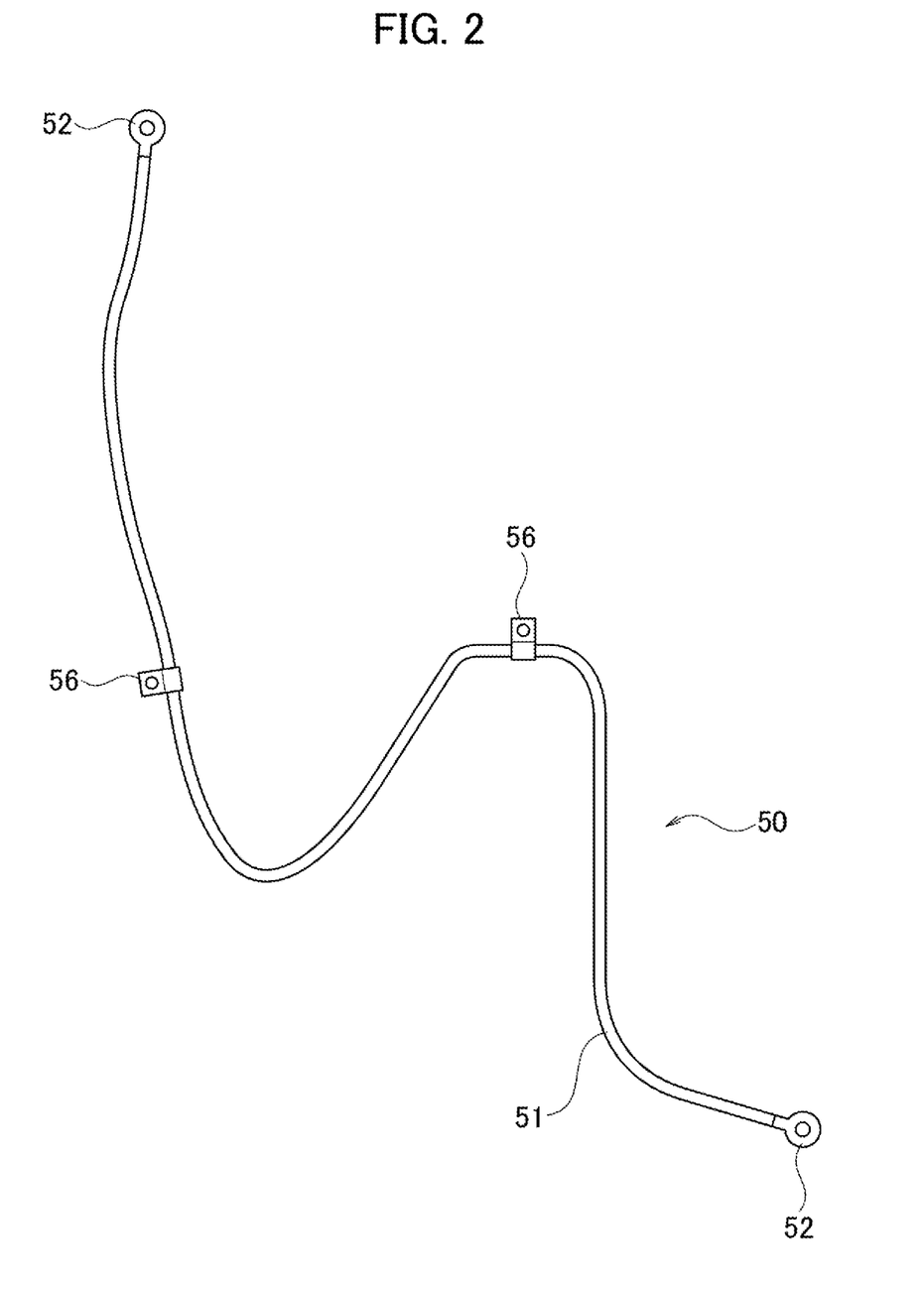
FIG. 2 is a diagram showing a detailed structure of a first cord-like member.

As shown in FIGS. 1 and 2, each first cord-like member 50 includes a wire 51, mounting members 52, and brackets 56.

The wire 51 is a cord-like body part constituting each first cord-like member 50. The wire 51 has sufficient strength such that the wire 51 is not easily broken even if the door body 1 is broken and a large tensile load acts on the wire 51. The wire 51 is formed by twisting a plurality of metal core wires, for example. However, it is sufficient if the wire 51 has the strength described above, and the wire 51 may be formed by twisting carbon fibers. Further, the wire 51 may be formed of a belt-like member having a constant width.

The mounting members 52 are provided at both ends of the wire 51. A mounting member 52 (hereinafter referred to as a "first mounting member 52" when necessary) corresponding to one end of the wire 51 fixes one end of the wire 51 to the first stiffening member 20. A mounting member 52 (hereinafter referred to as a "second mounting member 52" when necessary) corresponding to the other end of the wire 51 fixes the other end of the wire 51 to the third stiffening member 22.

The mounting members 52 are firmly fixed to the ends of the wire 51 such that the ends of the wire 51 are not detached easily. The mounting members 52 are crimp terminals and crimped to the ends of the wire 51, for example. Openings through which fastening members 54 such as bolts are inserted are formed in the mounting members 52. The mounting members 52 are attached in a fixed state to the first stiffening member 20 and the third stiffening member 22 by means of the fastening members 54.

One or more brackets 56 are provided at an intermediate part positioned between the first mounting member 52 and the second mounting member 52 of the wire 51. Specifically, the brackets 56 are provided between the central part of the wire 51 and the first mounting member 52, and between the central part of the wire 51 and the second mounting member 52. A bracket 56 (hereinafter, referred to as a "first bracket 56" when necessary) positioned nearer the first mounting member 52 holds the wire 51 on the second stiffening member 20. A bracket 56 (hereinafter, referred to as a "second bracket 56" when necessary) positioned nearer the second mounting member 52 holds the wire 51 in the lower part 14.

Figure 3:
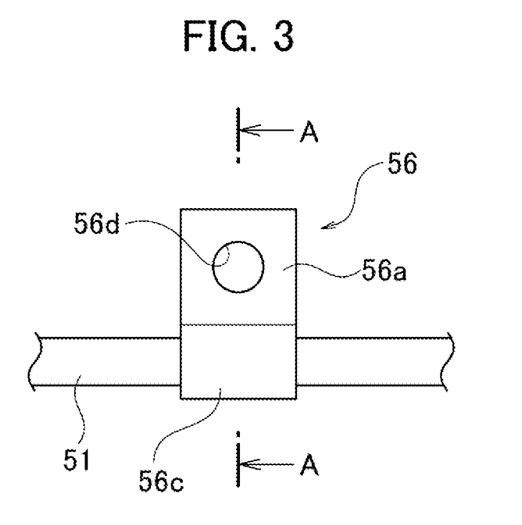
FIG. 3 is an explanatory diagram showing the configuration of a bracket.
Figure 4:
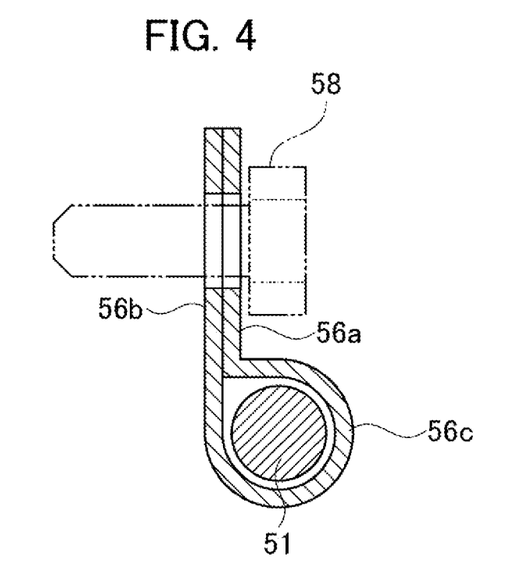
FIG. 4 is a cross-sectional view along line AA shown in FIG. 3.

As shown in FIGS. 3 and 4, each bracket 56 is formed by bending a flat plate, and includes an annular part 56c curved annularly and a pair of mounting pieces 56a and 56b connected to the annular part 56c.

A space is formed in the annular part 56c, and the wire 51 is inserted therein. The inner diameter of the annular part 56c is set to be larger than the outer diameter of the wire 51. The annular part 56c annularly surrounds the outer periphery of the wire 51. Due to this configuration, the bracket 56 holds the wire 51 such that the wire is movable.

The pair of mounting pieces 56a and 56b are portions for mounting the annular part 56c to the door body 10, and openings 56d through which fastening members 58 such as bolts are inserted are formed in the pair of mounting pieces 56a and 56b. The brackets 56 are attached in a fixed state on the second stiffening member 21 and in the lower part 14 by means of the fastening members 58.

As shown in FIG. 1, a second cord-like member 60 is provided in the upper part 11. The second cord-like member 60 is routed in the horizontal direction from the left first stiffening member 20 to the right first stiffening member 20. The second cord-like member 60 includes a wire 61 and mounting members 62.

The configurations of the wire 61 and the mounting members 62 correspond to the configurations of the wire 51 and the mounting members 52 of each first cord-like member 50. That is, a mounting member 62 corresponding to one end of the wire 61 fixes one end of the wire 61 to the left first stiffening member 20. A mounting member 62 corresponding to the other end of the wire 61 fixes the other end of the wire 61 to the right first stiffening member 20. The mounting members 62 are attached in a fixed state to the left and right first stiffening members 20 by means of fastening members 64.

The first cord-like members 50 and the second cord-like member 60 are continuously routed to extend from the first stiffening member 20 at the upper left, to the second stiffening member 21 at the left center, to the third stiffening member 22 at the lower center, to the second stiffening member 21 at the right center, to the first stiffening member 20 at the upper right, and then again to the first stiffening member 20 at the upper left. As a result, as in the case of the upper part 11, the left side part 12, the lower part 14, and the right side part 13 which are located around the opening 15, the three cord-like members 50 and 60 are connected in a closed loop shape via the five stiffening members 20, 21, and 22.

If a large load is input to the vehicle back door such as in a rear collision, there is a risk that the door body 1 may be broken and shattered. However, the cord-like members 50 and 60 are routed at important positions of the door body 1. Therefore, pieces of the door body 1 divided due to the breakage can be connected to each other by means of the cord-like members 50 and 60. This can suppress shattering of the door body 1.

Further, in accordance with the vehicle back door according to the present embodiment, brackets 56 for holding the wire 51 with respect to the door body 1 are provided at an intermediate part of the wire 51 routed from the first stiffening member 20 to the third stiffening member 22. The brackets 56 permit the movement of the wire 51. Since the mounting members 52 and the wire 51 are fixed, if the mounting members 52 are moved due to damage to the door body 1, the wire 51 is pulled. Even in such a situation, the intermediate part of the wire 51 can be moved with respect to the brackets 56. Therefore, it is possible to suppress a large load from acting on the brackets 56 attached to the door body 1. As a result, a concentration of stress at the mounting points (relay points) of the brackets 56 in the door body 1 can be relieved. Accordingly, breakage of the door body 1 can be suppressed.

In contrast to the first cord-like member 50 of the present embodiment, a configuration is considered in which a plurality of wires, for example, three wires that are first to third wires are continuously routed. That is, one end of the first wire is fixed to the first stiffening member 20 (the first fixing point), and the other end thereof is fixed to the second stiffening member 21 (the relay point). One end of the second wire is fixed to the second stiffening member 21 (the relay point), and the other end thereof is fixed to the lower part 14 (the relay point). Similarly, one end of the third wire is fixed to the lower part 14 (the relay point), and the other end thereof is fixed to the third stiffening member (the second fixing point). Even in such a configuration, the three wires are continuously routed to extend from the first stiffening member 20 to the third stiffening member 22 via the second stiffening member 21 and the lower part 14, similar to the first cord-like member 50.

However, in the case of a configuration in which a plurality of wires of which both ends are fixed are connected, the wires are firmly fixed even at the relay points. Therefore, if the wires are pulled by being dragged by the fixing point, a large load acts on the relay points. As a result, stress is concentrated at the relay points of the door body 1, and the door body 1 may be broken. In this regard, according to the first cord-like member 50 of the present embodiment, since the brackets 56 are applied to the relay points of the door body 1 as described above, it is possible to relieve a concentration of stress at the relay points. Accordingly, breakage of the door body 1 can be suppressed.

Further, in order to prevent excessive tensile force from occurring in the wire, it is necessary to set a sufficient allowance to the length of the wire to be longer than the length of the shortest route between the routing points. In the case of a configuration in which a plurality of wires of which both ends are fixed are connected, it is necessary to set an allowance to each wire. Meanwhile, according to the configuration of the present embodiment, the movement of the wire 51 is permitted by the brackets 56 which hold the intermediate part of the wire 51. Therefore, if a surplus length (allowance) corresponding to a prescribed margin is set to the overall length of the wire 51, the surplus length corresponding to the margin can be utilized between each routing point by moving the wire 51. This can shorten the overall length of the wire 51 as compared with the case where a plurality of wires are routed. Therefore, weight increase and cost increase due to the wire 51 can be suppressed.

According to the first cord-like member 50 of the present embodiment, both ends of the wire 51 are fixed, and the intermediate part of the wire 51 is held by the brackets 56. Since both ends of the wire 51 are fixed, a situation occurs in which the end of the wire 51 is pulled due to the damage to the door body 1 or the like. Even if the end of the wire 51 is pulled, a large load is suppressed from acting on the brackets 56 which hold the intermediate part of the wire 51. This can relieve a concentration of stress in the door body 1. Accordingly, breakage of the door body 1 can be suppressed.

In accordance with the vehicle back door according to the present embodiment, the annular part 56c of the bracket 56 is configured to annularly surround the outer periphery of the wire 51. Therefore, the outer periphery of the wire 51 is not tightly clamped by the bracket 56, and a gap is secured between the outer periphery of the wire 51 and the bracket 56. Due to the presence of the gap, the bracket 56 can permit the movement of the wire 51.

Further, according to the vehicle back door of the present embodiment, a holding member for holding the wire 51 in a movable manner is constituted by the bracket 56 attached to the door body 1. According to this configuration, the wire 51 can be easily held by attaching the bracket 56 to the door body.

Meanwhile, the bracket 56 of the present embodiment annularly surrounds the outer periphery of the wire 51. Therefore, the wire 51 is held without coming off from the bracket 56 even if the wire 51 is pulled. However, the bracket 56 can permit the movement of the wire 51. Therefore, even when the wire 51 is pulled, the wire 51 can be released. Accordingly, the bracket 56 is not pulled together with the wire 51, and a large load can be suppressed from acting on the bracket 56. This can relieve a concentration of stress in the door body 1. Accordingly, breakage of the door body 1 can be suppressed.

Figure 5:
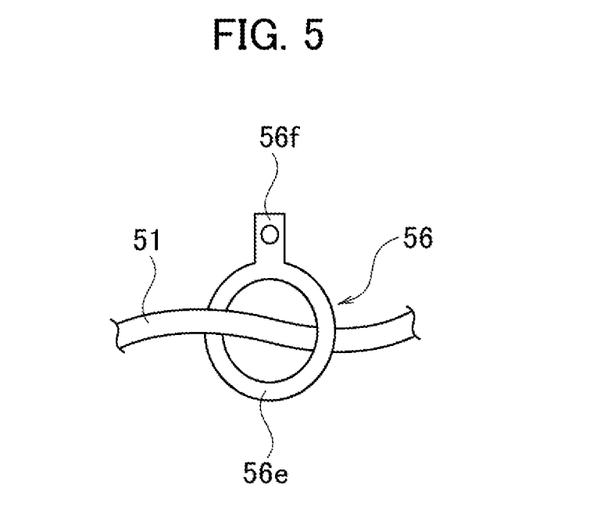
FIG. 5 is an explanatory diagram showing a modified example of a bracket.

In the above-described embodiment, the bracket 56 formed by curving a flat plate is exemplified. However, the bracket may be configured to hold the outer periphery of the wire 51 while the gap is retained between the bracket 56 and the outer periphery of the wire 51. The bracket 56 may include a ring part 56e formed into a closed loop shape and a mounting part 56f for mounting the ring part 56e to the door body 1 as shown in FIG. 5, for example. The wire 51 can be movably held by the ring part 56e by inserting the wire 51 into the ring part 56e.

In the above-described embodiment, the bracket 56 is attached to the door inner panel 10. However, the wire 51 is routed in a space part between the door inner panel 10 and the door outer panel 30 which face each other. Therefore, as shown in FIG. 6, a bracket 35 provided on the door outer panel 30 may movably hold the wire 51. The bracket 35 shown in FIG. 6 has a bracket body 36 attached on the door outer panel 30 and a through hole 37 formed in the bracket body 36. The bracket 35 can movably hold the wire 51 by inserting the wire 51 into the through hole 37.

Further, in the above-described embodiment, the bracket 56 for holding the intermediate part of the wire 51 is applied to the first cord-like member 50, but the bracket is not applied to the second cord-like member 60. However, the bracket for holding the intermediate part of the wire 61 may be applied to the second cord-like member 60.

Further, in the above-described embodiment, the brackets 56 are set at two positions of the intermediate part of the wire 51. However, it is sufficient if the brackets 56 are provided such that the wire 51 spans locations where it is assumed that the door body 1 will break. The number of the brackets 56 may be determined depending on the structure of the door body 1.

Figure 7:
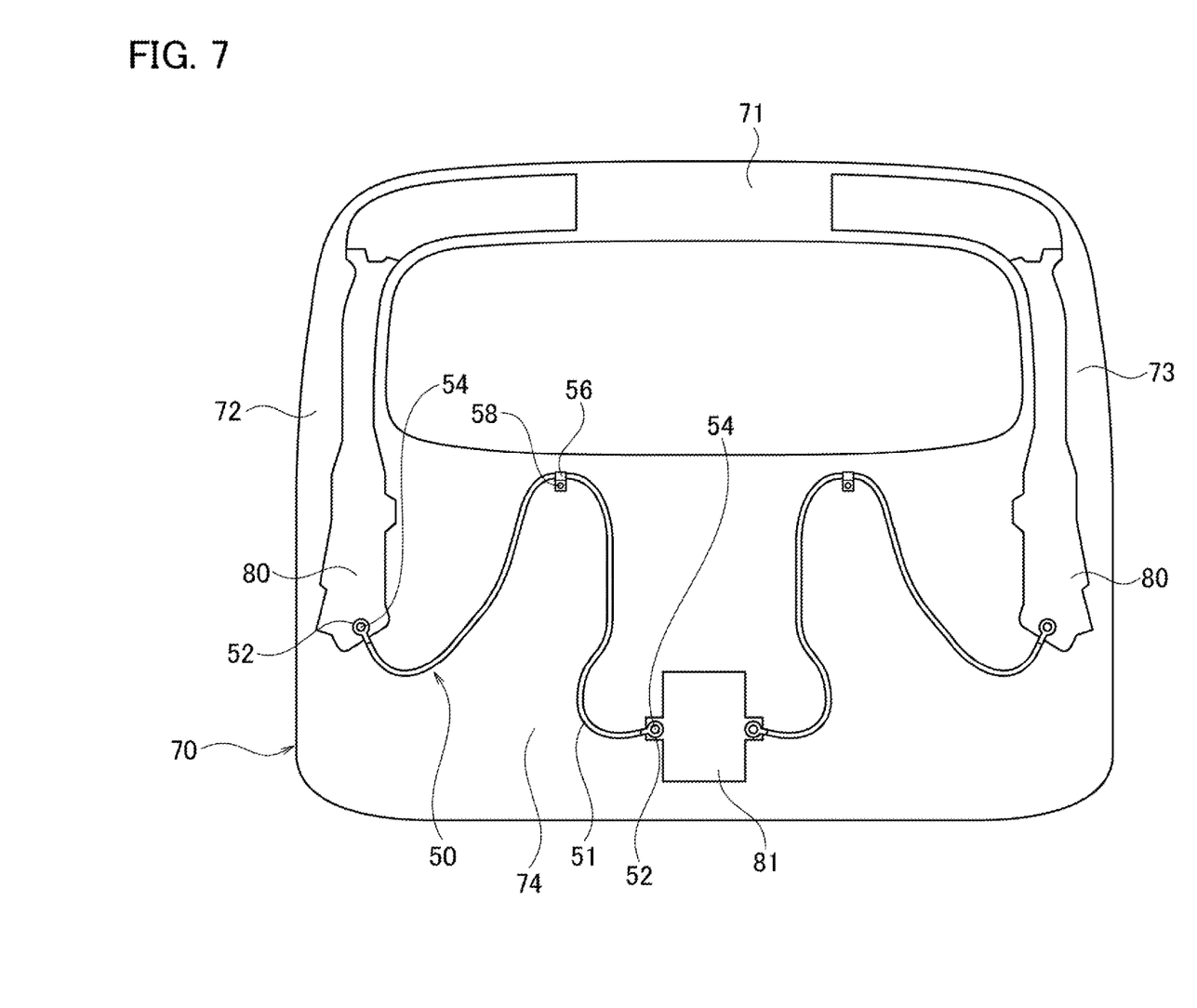
FIG. 7 is an explanatory diagram showing a configuration of a vehicle back door according to a modified example.

FIG. 7 shows a door inner panel 70 according to a modified example, for example. The door inner panel 70 includes an upper part 71, side parts 72 and 73 respectively positioned on the left and right sides, and a lower part 74. Wires 51 of the first cord-like members 50 are routed from stiffening members 80 to a stiffening member 81 for reinforcing a latch unit, the stiffening members 80 spanning from the side parts 72 and 73 to the lower part 74. A bracket 56 is provided at one place of the intermediate part of the wire 51. The intermediate part of the wire 51 is movably held by the bracket 56.

In the above-described embodiment, the bracket 56 is attached to the door body 1, and the wire 51 is movably held via the bracket 56. However, the wire 51 may be movably held by a door component constituting part of the door body 1 instead of another attachable/detachable component such as the bracket 56.

Figure 8:
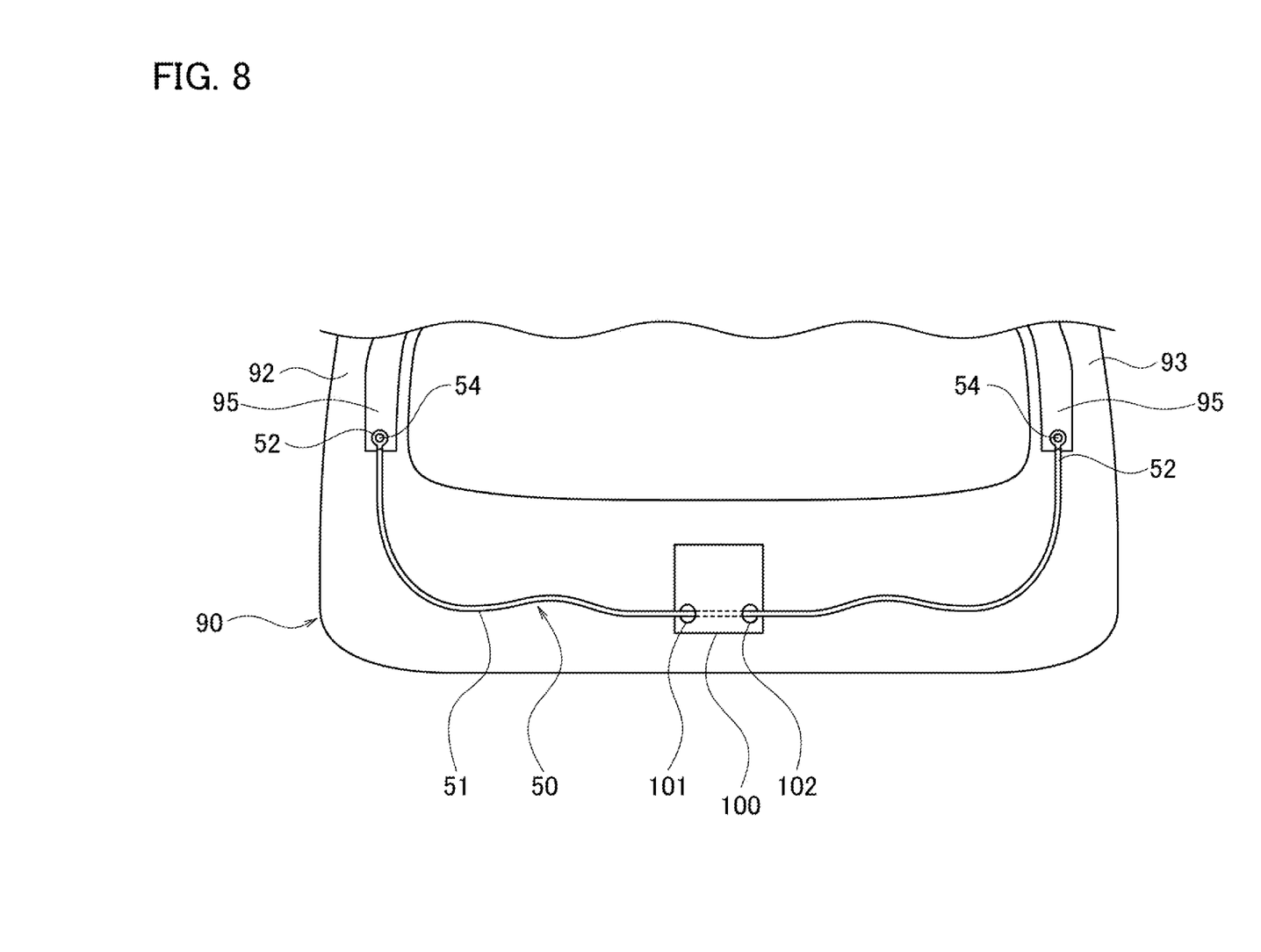
FIG. 8 is an explanatory diagram showing a configuration of a vehicle back door according to a modified example.

FIG. 8 shows a door inner panel 90 according to a modified example, for example. A wire 51 of the first cord-like member 50 is routed from a stiffening member 95 of the left side part 92 to a stiffening member 95 of the right side part 93. The intermediate part of the wire 51 is inserted into through holes 101 and 102 formed in a stiffening member 100 for reinforcing a latch unit. The intermediate part of the wire 51 is movably held by the through holes 101 and 102 of the stiffening member 81.

According to this configuration, the stiffening member 81 serving as a door component can be used as a holding member. Therefore, an increase in the number of components and cost can be suppressed. The movement of the wire 51 can be permitted by inserting the wire 51 into the through holes 101 and 102 of the stiffening member 81.

Figure 9:
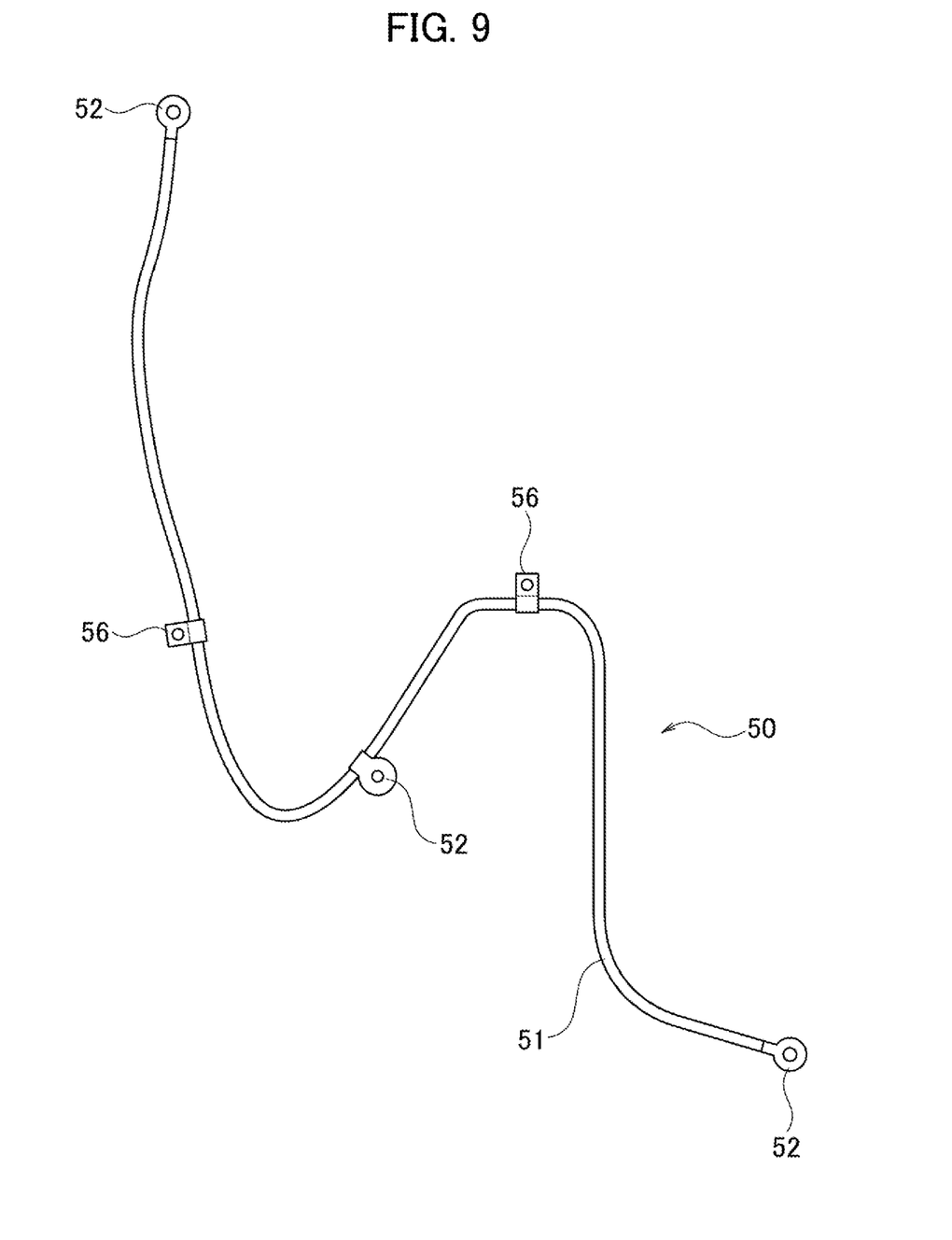
FIG. 9 is a diagram showing a structure of a cord-like member according to a modified example.

Further, according to the present embodiment, mounting members 52 for holding the wire 51 in a fixed state are provided only at both ends of the wire 51. However, as shown in FIG. 9, mounting members 52 for holding the wire 51 in a fixed state may be provided at one or more places of the intermediate part of the wire 51 by considering the total length of the wire 51.

Further, the mounting members 52 may be provided not only at both ends of the wire 51 but also in the vicinity of both ends, and surplus portions including the ends of the wire 51 may be provided outside the mounting members 52. That is, it is sufficient if the wire 51 is routed at least from a first fixing point to a second fixing point.

In the present embodiment, the mounting members 52 are provided at both ends of the wire 51. However, both ends of the wire 51 may be folded into a loop shape, the fastening members 54 may be inserted into both ends having the loop shape, and both ends of the wire 51 may be fixed to the first fixing point and the second fixing point. Further, both ends of the wire 51 may be firmly fastened to the first fixing point and the second fixing point. The mounting members 52 do not need to be composed of a member separate from the wire 51, and the wire 51 itself may function as a part of the mounting members 52.

As described above, although an embodiment of the present invention have been described, it should not be understood that the arguments and drawings forming part of this disclosure are intended to limit the present invention. Various alternative embodiments, examples, and operational techniques will be apparent to those skilled in the art from this disclosure.

REFERENCE SIGNS LIST

1 Door body 1
10 Door inner panel
20, 21, 22 Stiffening members
30 Door outer panel
50 Cord-like member
51 Wire
52 Mounting member
56 Bracket
70 Door inner panel
80, 81 Stiffening members
90 Door inner panel
95, 100 Stiffening members

The invention claimed is:

1. A vehicle back door that opens and closes an opening at a rear of a vehicle body, the vehicle back door comprising:
a door body formed of a resin panel member; and
a cord-like member provided in the door body,
wherein the cord-like member includes:
a cord-like body part that is routed from a first fixing point to a second fixing point of the door body,
a first mounting member that is mounted to the first fixing point and fixes the cord-like body part to the first fixing point,
a second mounting member that is mounted to the second fixing point and fixes the cord-like body part to the second fixing point, and
a holding member that is provided in the door body and movably holds an intermediate part, between the first mounting member and the second mounting member, of the cord-like body part;
wherein the resin panel member includes a plurality of stiffening members for compensating a rigidity of the resin panel member;
wherein the first mounting member and the second mounting member are each fixed to one of the plurality of stiffening members, and
wherein the holding member is directly fixed to the resin panel member at a different position from the plurality of stiffening members.

2. The vehicle back door according to claim 1, wherein the first mounting member is provided at one end of the cord-like body part and fixes the one end to the first fixing point, and
the second mounting member is provided at the other end of the cord-like body part and fixes the other end to the second fixing point.

3. The vehicle back door according to claim 1, wherein the holding member holds an outer periphery of the cord-like body part while a gap is retained between the holding member and the outer periphery of the cord-like body part.

4. The vehicle back door according to claim 3, wherein the holding member is a bracket that can be attached to and detached from the door body, and
the bracket includes an annular part that annularly surrounds the outer periphery of the cord-like body part, and a mounting piece that mounts the annular part to the door body.

* * * * *